(12) United States Patent
Bianco et al.

(10) Patent No.: US 8,629,632 B2
(45) Date of Patent: Jan. 14, 2014

(54) LED BACKLIGHT DRIVER

(75) Inventors: Piero Bianco, Fremont, CA (US);
Stefano Casula, Assago (IT)

(73) Assignee: Maxim Integrated Products, Inc., San Jose, CA (US)

( * ) Notice: Subject to any disclaimer, the term of this patent is extended or adjusted under 35 U.S.C. 154(b) by 160 days.

(21) Appl. No.: 13/197,492

(22) Filed: Aug. 3, 2011

(65) Prior Publication Data

US 2012/0119653 A1 May 17, 2012

Related U.S. Application Data

(60) Provisional application No. 61/412,758, filed on Nov. 11, 2010.

(51) Int. Cl.
*H05B 37/00* (2006.01)
(52) U.S. Cl.
USPC .......................................................... 315/312
(58) Field of Classification Search
USPC ......... 315/169.1, 169.2, 169.3, 170; 345/204, 345/698, 76, 77, 82, 84, 87, 92, 93
See application file for complete search history.

(56) References Cited

U.S. PATENT DOCUMENTS

| | | | |
|---|---|---|---|
| 6,400,101 B1* | 6/2002 | Biebl et al. | 315/291 |
| 6,515,434 B1* | 2/2003 | Biebl | 315/291 |
| 7,480,463 B2* | 1/2009 | Yamamoto et al. | 398/182 |
| 2005/0029527 A1* | 2/2005 | Yamamoto et al. | 257/79 |
| 2009/0289559 A1* | 11/2009 | Tanaka et al. | 315/185 R |
| 2010/0237787 A1* | 9/2010 | Vogler et al. | 315/185 R |
| 2011/0227490 A1* | 9/2011 | Huynh | 315/185 R |
| 2011/0273102 A1* | 11/2011 | van de Ven et al. | 315/193 |

* cited by examiner

*Primary Examiner* — Minh D A
(74) *Attorney, Agent, or Firm* — North Weber & Baugh LLP

(57) ABSTRACT

The present invention relates to a LED driver that minimizes the driver electronic pin count and integrates the short circuit protection feature. An NPN bipolar transistor is employed in a boost converter configuration to drive a LED string in the backlight display applications. The bipolar transistor is integrated with the driver electronics by two pins. Drive current is injected from the NPN transistor to the LED string to minimizing high voltage connection of each LED string to one.

20 Claims, 3 Drawing Sheets

LED BACKLIGHT DRIVER

CROSS REFERENCE TO RELATED PATENT APPLICATIONS

This application claims priority to U.S. Provisional Application Ser. No. 61/412,758, entitled "A LED Backlight Driver," filed Nov. 11, 2010, which application is incorporated herein by reference in its entirety.

BACKGROUND

A. Technical Field

The present invention relates to a LED driver. More particularly, certain embodiments of the present invention relate to using an NPN bipolar transistor (BJT) to drive a LED string to minimize high voltage driving voltage pins and reduce the risk of short circuit.

B. Background of the Invention

Semiconductor-based solid-state lighting (SSL), until recently associated mainly with simple indicator lamps in electronics and toys, has become as bright and more efficient than other lighting technologies. In particular, the enormous technology improvements have been achieved on light emitting diodes (LEDs) over the past years. LEDs have been available for various wavelengths and suitable for white illumination. Lifetime of LEDs is also extended to more than 100 thousand hours, and can work at input powers up to many watts.

LEDs are connected in series as a LED string for use in lighting applications. Conventional LEDs used as indicator lamps operate with low voltage and current (e.g. 1.5V, 10 mA) and a constant direct current (DC) supply is sufficient to drive these indictor LEDs. However, each power LED in the LED string used for backlighting or illumination requires a nominal current anywhere in the range of 35-1400 mA, a forward voltage drop of 3V and large manufacturing tolerances. The LED string has to be driven with power electronics to provide controlled LED current and avoid power consumption by series parasitic resistors.

In order to avoid losses in the series resistors, the LED strings are powered by switched mode power supplies and linear regulators are normally used to stabilize the LED output current when more than one string is present. The standard buck, boost and buck-boost DC/DC converter topologies may be used to provide the supply voltage needed by the LEDs.

FIG. 1 illustrates a standard LED lighting system 100 comprising LED driver electronics 102 and LED strings 104, which are implemented on two separate electronic boards. The driver electronics board 102 and the LED string board 104 are further packaged into a system using cables. The two illustrated LED strings on the LED string board 104 share a common power supply 120 and have separate pins 122 and 124 to drain the current. The core of the LED driver electronic board 102 is a LED driver controller 106 which receives appropriate power supplies and digital controls and generates analog voltages needed to bias LED driver transistors 108 and 110 in a boost converter configuration. The LED driver transistors 108 and 110 are two NPN bipolar junction transistors, each driving a separate LED string. Although most driver electronics are integrated on the driver controller chip 106, discrete components are preferred for the LED driver transistors 108 and 110 due to their capability of handling larger current. The driver transistors 108 and 110 are integrated with the LED driver electronic board 102 with connections to three pins (collector, base and emitter) of the driver integrated circuit (IC) 106. The current drains of the LED string board 104 are connected with the collectors 122 and 124 of the driver transistors 108 and 110. The current provided by the driver transistors 108 and 110 ranges from 30 mA to 350 mA to meet the requirements for various applications, such as notebook computers, LCD monitors or flat screen televisions.

For use in backlighting displays, the standard LED lighting system 100 has to address several concerns. The LED drive current should be monitored and controlled in the LED driver electronics 102 as needed. System efficiency is optimized only if optimal boost output voltage is applied to minimize the voltage on the collectors of the driver transistors 108 and 110. Pin reduction of the custom driver controller chip 106 is always desirable. In particular, reduction of the analog pins to the driver transistors is highly preferred because it can greatly reduce the cost of the chip 106. In this boost converter configuration, both the high-end supply 120 and low-end current sinks 122 and 124 are at high analog voltage levels and the risk of shorting them to ground always exist as far as embedded system integration between boards or chips is involved.

SUMMARY OF THE INVENTION

The present invention relates to a LED driver that minimizes the driver electronic pin count and the risk of LED short circuit. In this LED driver, an NPN bipolar transistor is employed in a boost converter configuration to drive a LED string in the backlight display applications. This invention allows to reduce the number of pins of controller IC needed to control each transistor from 3 to 2. Drive current is injected from the NPN transistor to the LED string and further drained to ground. Each LED string is connected between the NPN transistor emitter and the ground, having only one high voltage node and minimizing the risk of shorting high voltage nodes to the ground during system integration.

One skilled in the art may realize that a similar boost converter LED driver may be implemented using n-channel metal-oxide-semiconductor field-effect transistor (N-channel MOSFET, NMOS transistor). To generate the same LED illumination density, the transistor size, the control voltage levels and the peripheral electronic components have to be adjusted while the configuration maintains the same.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates a block diagram of a LED lighting system according to various embodiments of the invention.

DETAILED DESCRIPTION OF THE PREFERRED EMBODIMENTS

Embodiments of the present invention provide systems, devices and methods for a LED driver. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Figure 1:
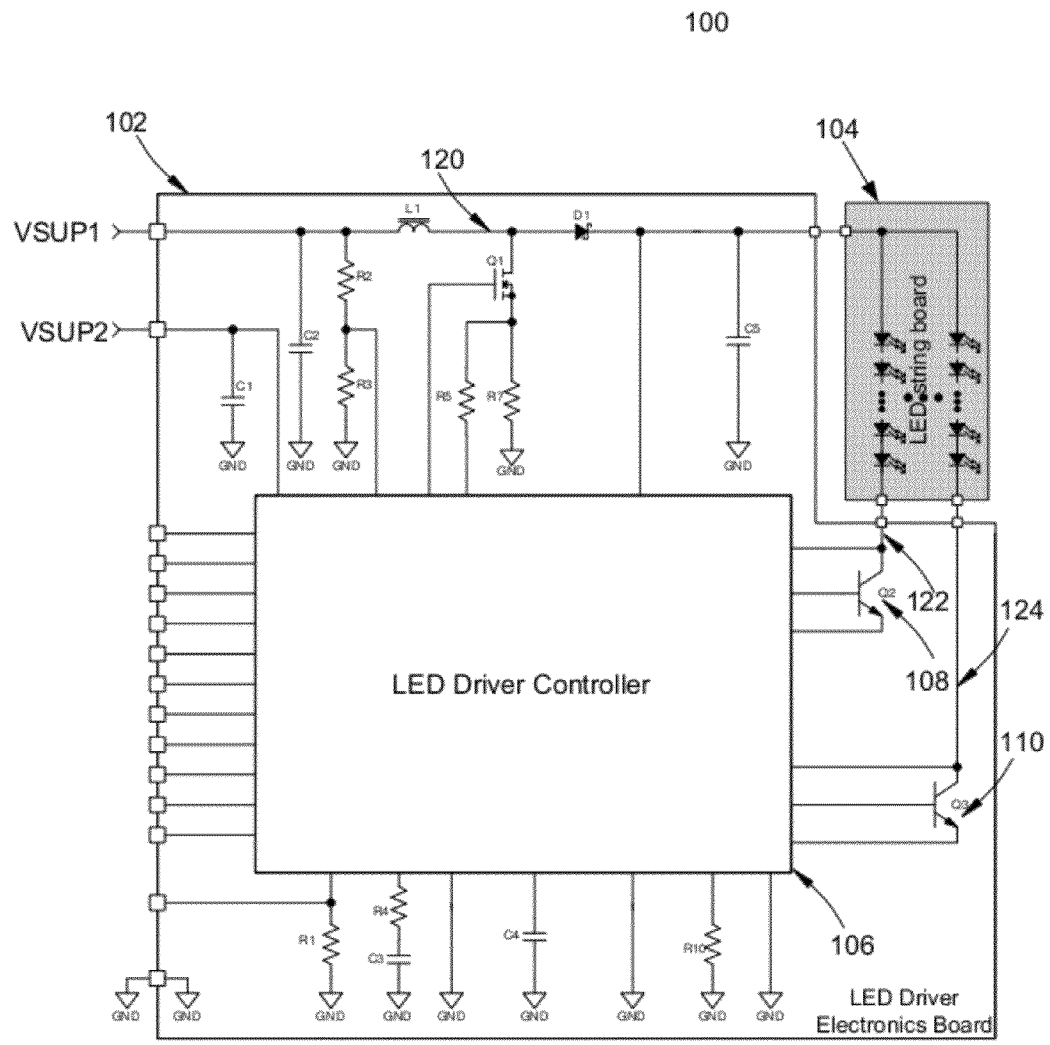
Figure 2:
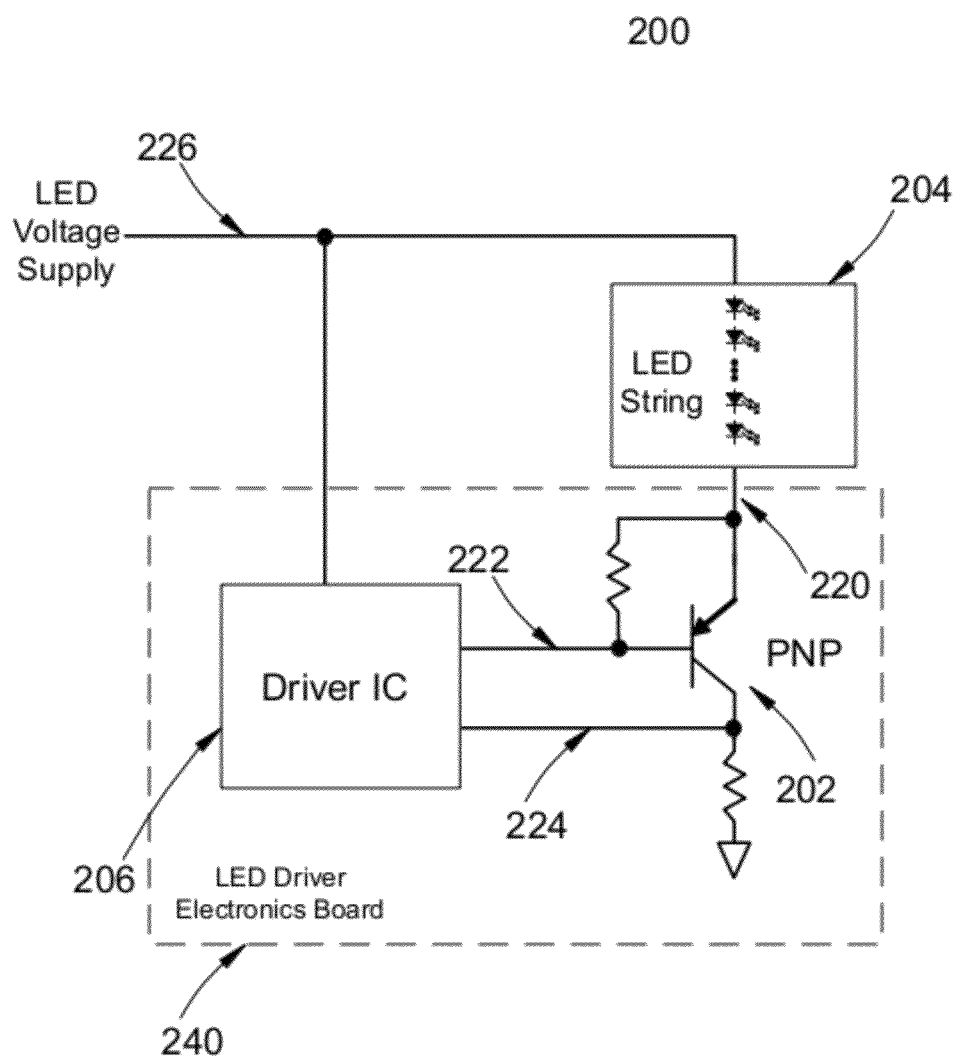
FIG. 2 illustrates a block diagram boost-converter LED driver based on PNP bipolar transistor according to various embodiments of the invention.

FIG. 2 illustrates a conceptual block diagram of a prior art boost-converter LED driver system 200 based on PNP bipolar transistor 202. The PNP bipolar transistor 202 is connected in a common-collector (CC) configuration. Both ends of each LED string in the LED string board 204 have non-zero, and sometimes high-voltage, biases; and large currents ranging from 30 mA to 350 mA passes through the string ends. Integrated with the LED driver electronics board 240, the LED string board 204 requires additional short circuit protection. In certain embodiment, an accidental short circuit happens between the LED voltage supply 226 and the ground when the wire that connects the driver board with the LED board accidentally touches the ground. Such shorting between the voltage supply and the ground will cause catastrophic failure in the PNP transistors. For this reason, with this design an additional protection circuit is needed to prevent this event.

Figure 3:
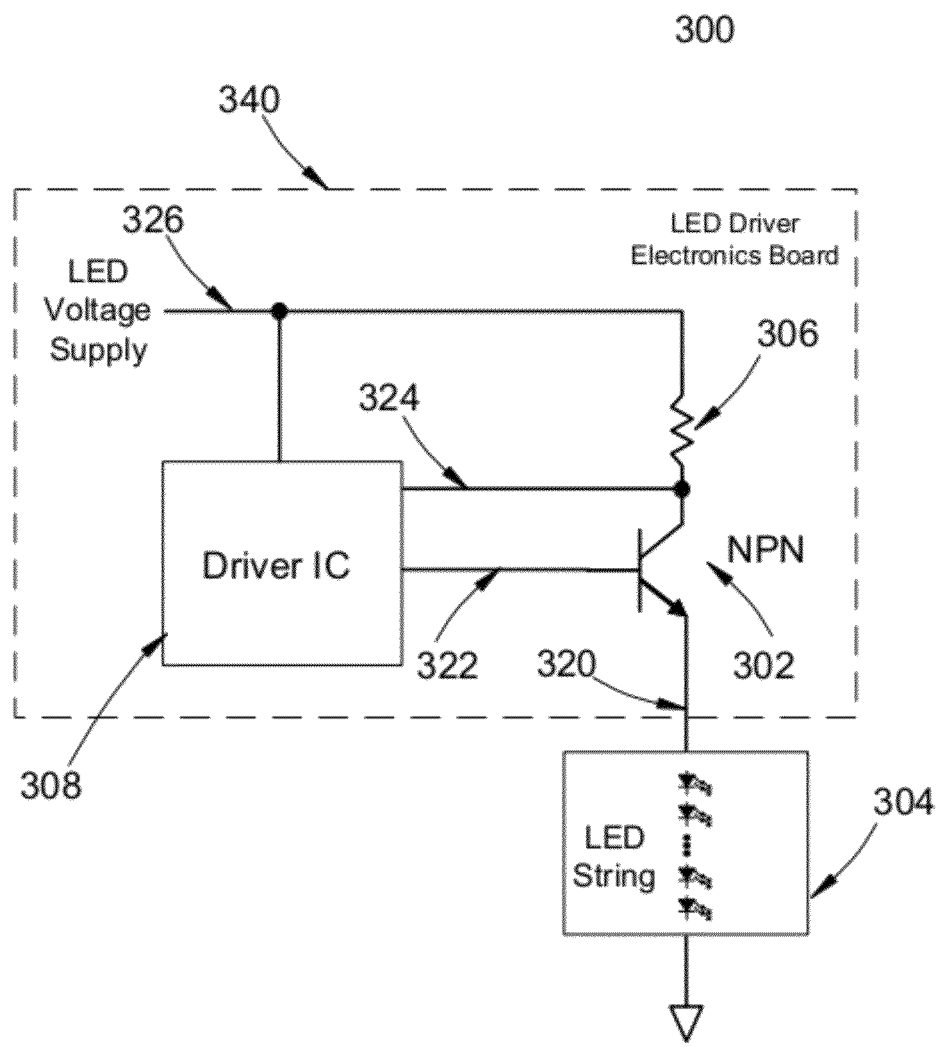
FIG. 3 illustrates a block diagram of a boost-converter LED driver based on NPN bipolar transistor according to various embodiments of the invention.

FIG. 3 illustrates a block diagram of a boost-converter LED driver system 300 based on an NPN bipolar transistor 302. Multiple LED strings are present in the system, and, each string is driven by a separate transistor 302 and resistor 306. The NPN bipolar transistor 302 is connected in a common-collector (CC) configuration. The voltage gain is approximately equal to 1 between the emitter 320 and the base 322 while the current injected into the emitter 320 amplifies the base current by a gain of $\beta$. Therefore, the LED string is driven by a current typically 100-150 times of the base current injected from the driver IC 308. Similar to the LED driver system 200, the LED driver system 300 only needs two pins of the driver IC 308 to control each NPN transistor 302. The LED driver electronics board 340 and the LED string board 340 share only one high-voltage large-current node 320 for each LED string, and the low ends of the LED strings share a common connection to the ground. In certain embodiment, if the node 320 is shorted to the ground due to wire touching, the driver IC 308 can detect this failure by detecting an increase in LED current passing through the resistor 306 and, therefore, disable the NPN transistor 302 to protect the whole system. As a result, the NPN-based LED system 300 does not need additional short circuit protection.

In addition to the benefit of reducing the short-circuit risk, the boost converter LED driver 300 improves cost efficiency. Discrete components of NPN bipolar transistors cost much less than those of PNP bipolar transistors. A backlighting display application requires multiple LED strings and cost may be significantly reduced.

The boost converter LED driver 300, like driver 200, also accommodates an easy implementation of LED fault detection/protection and efficiency optimization. In one embodiment, a LED short circuit event is detected by the driver IC 308 if the voltage needed on the base of the NPN transistor (322) to maintain the present LED current (detected on resistor 306) exceeds a certain threshold. An LED open circuit event is detected by detecting a low current on resistor 306. In both cases, the driver IC 308 can disable the faulty string by turning off the NPN transistor 322. In addition, the boost converter LED driver 300 allows the optimization of the LED supply voltage to maximize efficiency, because the LED supply voltage can be reduced until the voltage difference between nodes 324 and 322 is as low as possible, while being high enough to keep the NPN transistors 302 for all strings in their active zone.

One skilled in the art will recognize that the aforementioned boost converter may be implemented by an n-channel metal-oxide-semiconductor field-effect transistor (N-channel MOSFET, NMOS transistor). The NMOS transistor is connected in common drain configuration (source follower). The driver output voltage follows the NMOS gate voltage generated by a driver IC and the current injected into the LED string is determined by the driver output voltage. MOSFET-based amplifiers may have limited current driving capability compared to BJT-based amplifiers; however, a NMOS-based boost converter is easier to be implemented using power transistors, such as a drain-extended NMOS transistor or a double-diffused NMOS transistor, provided by some analog technologies. Therefore, the NMOS-based boost converter may be integrated into the driver IC chip, and the limited cost increase caused by using monolithic power transistors is easily compensated by packaging cost savings. The pin count is further reduced to one, the LED drive voltage, and the benefit of one high voltage connection with the LED string board is retained.

One skilled in the art will also recognize that the above-described structures and methods may be applied many different types of LED driver circuits including both isolated and non-isolated topologies. For example, an isolated LED driver in a flyback topology may also be realized with the performance enhancements described above.

One skilled in the art will recognize that other components and functionality may be inserted within the specific examples shown in the figures. Additionally, these examples may be modified to handle different power characteristics of LEDs or LED strings.

It will be appreciated to those skilled in the art that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the claims in the future non-provisional application will include all such modifications, permutation and equivalents as fall within the true spirit and scope of the present invention.

We claim:

1. A light emitting diode (LED) driver system, comprising:
    a driver IC, coupled to a voltage supply, the driver IC generating a base voltage and senses a collector voltage;
    an NPN bipolar transistor, coupled to the driver IC, the NPN bipolar transistor being driven by the collector voltage and the base voltage at a collector and a base, respectively, to generate an LED current at an emitter according to a common-collector configuration;
    an LED string, coupled to the NPN bipolar transistor, the LED string being biased between the emitter of the NPN bipolar transistor and the ground and driven by the LED current; and
    a series resistor, coupled between the voltage supply and the NPN bipolar transistor, the series resistor being arranged in series with the NPN bipolar transistor and having a preferred resistance value that at least partially controls the LED current through the NPN bipolar transistor.

2. The LED driver system in claim 1, wherein the driver IC senses the base voltage and the collector voltage to detect open circuit and short circuit for the LED string.

3. The LED driver system in claim 1, wherein the LED string is parallel to a parallel string that comprises at least one LED and is also biased between the emitter of the NPN bipolar transistor and the ground.

4. The LED driver system of claim 1, wherein the NPN transistor is integrated with the driver IC in a package.

5. The LED driver system in claim 1, wherein the driver IC, the NPN bipolar transistor and the series resistor are packaged on an LED driver electronics board such that one high voltage pin is used at the interface of the LED driver electronics board and the LED string.

6. The LED driver system in claim 1, wherein the NPN bipolar transistor is connected in the common-collector configuration in which the voltage gain is approximately equal to 1 between the emitter and the base and the LED current is amplified from a current injected into the base.

7. The LED driver system in claim 1, further comprising:
    a second NPN bipolar transistor, coupled to the driver IC, the second NPN bipolar transistor being driven by a second collector voltage and a second base voltage at a second collector and a second base, respectively, to generate a second LED current at a second emitter according to the common-collector configuration;
    a second LED string, coupled to the second NPN bipolar transistor, the LED string being biased between the second emitter and the ground and driven by the second LED current;
    a second series resistor, coupled between the voltage supply and the second NPN bipolar transistor, the second series resistor having a second preferred resistance value that at least partially controls the second LED current through the second NPN bipolar transistor; and
    wherein the driver IC generates the second base voltage and senses the second collector voltage.

8. A light emitting diode (LED) driver system, comprising:
    a driver IC, coupled to a voltage supply, the driver IC generating a gate voltage and senses a drain voltage;
    an NMOS transistor, coupled to the driver IC, the NMOS transistor being driven by the gate voltage and the drain voltage at a gate and a drain, respectively, to generate an LED current at a source according to a common-drain configuration;
    an LED string, coupled to the NMOS transistor, the LED string being biased between the source of the NMOS transistor and the ground and driven by the LED current; and
    a series resistor, coupled between the voltage supply and the NMOS transistor, the series resistor being arranged in series with the NMOS transistor and having a preferred resistance value that at least partially controls the LED current through the NMOS transistor.

9. The LED driver system in claim 8, wherein the driver IC senses the gate voltage and the drain voltage to detect open circuit and short circuit for the LED string.

10. The LED driver system in claim 8, wherein the LED string is parallel to a parallel string that comprises at least one LED and is also biased between the source of the NMOS transistor and the ground.

11. The LED driver in claim 8, wherein the NMOS transistor is integrated in the driver IC.

12. The LED driver system in claim 8, wherein the driver IC, the NMOS transistor and the series resistor are packaged on an LED driver electronics board such that one high voltage pin is used at the interface of the LED driver electronics board and the LED string.

13. The LED driver system in claim 8, further comprising:
    a second NMOS transistor, coupled to the driver IC, the second NMOS transistor being driven by a second drain voltage and a second gate voltage at a second drain and a gate base, respectively, to generate a second LED current at a second source according to a common-drain configuration;
    a second LED string, coupled to the second NMOS transistor, the LED string being biased between the second source and the ground and driven by the second LED current; and
    a second series resistor, coupled between the voltage supply and the second NMOS transistor, the second series resistor having a second preferred resistance value that at least partially controls the second LED current through the second NMOS transistor; and
    wherein the driver IC generates the second gate voltage and senses the second drain voltage.

14. A method of driving light emitting diodes (LEDs), comprising steps of:
    coupling a low end of an LED string to the ground, the LED string comprising at least one LED;
    coupling a high end of the LED string to an LED driver electronics via a high voltage pin, the LED driver electronics comprising a transistor that functions in a linear region and generates an LED current, a series resistor being coupled between a voltage supply and the transistor in the LED electronics and arranged in series with the transistor to at least partially control the LED current; and
    injecting the LED current from the high end to the low end of the LED string.

15. The method of driving LEDs in claim 14, wherein the transistor is a NPN bipolar transistor that is connected in a common-collector configuration, the emitter of the NPN bipolar transistor being connected to the high voltage pin to inject the LED current.

16. The method of driving LEDs in claim 14, wherein the transistor is an n-channel metal-oxide-semiconductor field-effect transistor (NMOS transistor) that is connected in a common-drain configuration, the source of the NMOS transistor being connected to the high voltage pin to inject the LED current.

17. The method of driving LEDs in claim 14, wherein the LED driver electronics further comprises a driver IC and a series resistor, the driver IC, the series resistor and the transistor being integrated on the substrate of the LED driver electronics.

18. The method of driving LEDs in claim 17, wherein the series resistor is biased between a power supply and a control voltage, and the voltage drop on the series resistor is used to control the LED current and detect open and short circuit of the LED string.

19. The method of driving LEDs in claim 14, wherein the LED string is parallel to a parallel string that comprises at least one LED and is also biased between the high and low ends.

20. The method of driving LEDs in claim 14, further comprising steps of:
   connecting a low end of a second LED string to the ground;
   connecting a high end of a second LED string to the LED driver electronics via a second high voltage pin, the LED driver electronics further comprising a second transistor that functions in a linear region and generates a second LED current; and
   injecting the second LED current from the high end to the low end of the second LED string by the second transistor.

* * * * *